United States Patent
Blanchard

[15] 3,685,029
[45] Aug. 15, 1972

[54] MAGNETIC MEMORY MEMBER

[72] Inventor: Joseph Louis Blanchard, Cachan, France

[73] Assignee: Compagnie Internationale Pour L'Informatique, Louveciennes, France

[22] Filed: April 20, 1970

[21] Appl. No.: 30,068

[30] Foreign Application Priority Data

May 2, 1969 France ......................6913974

[52] U.S. Cl..340/174 QA, 340/174 ZB, 340/174 TF, 340/174 SR

[51] Int. Cl. ............................................G11b 5/00

[58] Field of Search ..................340/174 QA, 174 ZB

[56] References Cited

UNITED STATES PATENTS

| | | | |
|---|---|---|---|
| 3,438,016 | 4/1969 | Spain | 340/174 ZB |
| 3,531,783 | 9/1970 | Doyle | 340/174 QA |
| 3,488,639 | 1/1970 | Stein | 340/174 QA |
| 3,459,517 | 8/1969 | Feldtkeller | 340/174 QA |

*Primary Examiner*—Maynard R. Wilbur
*Assistant Examiner*—Robert F. Gnuse
*Attorney*—Kemon, Palmer and Estabrook

[57] ABSTRACT

There is disclosed an improved structure of a binary information memory member made of thin layers and comprising magnetic domain propagation channels. This member includes a first thin layer of a soft magnetic anisotropic material coated with a second layer of a hard magnetic material, and the propagation channels are defined therein by providing non magnetic metallizations patterned according to the required propagation channels between the first and the second magnetic layers of the member.

5 Claims, 1 Drawing Figure

PATENTED AUG 15 1972 3,685,029
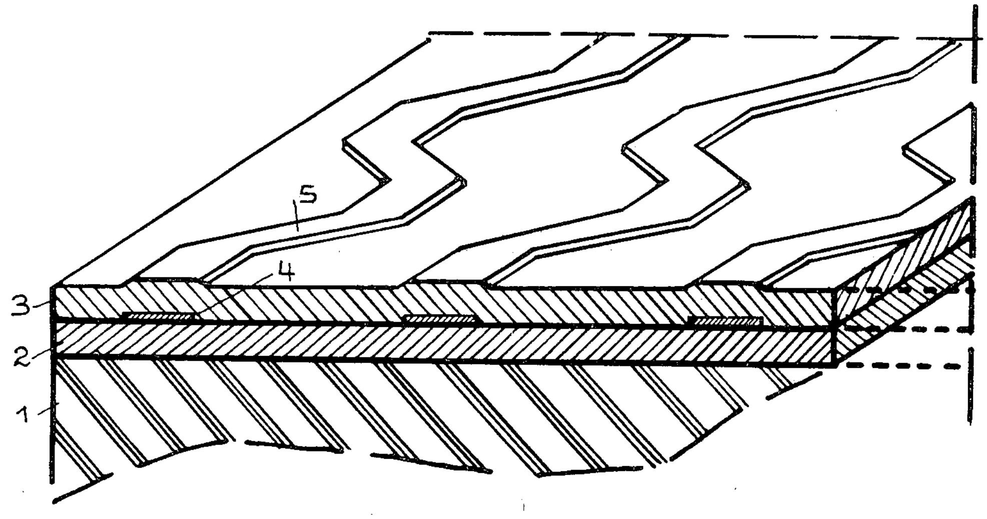
Joseph Louis Blanchard
INVENTOR
Kemon, Palmer & Estabrook
ATTORNEYS

MAGNETIC MEMORY MEMBER

FIELD OF THE INVENTION

The invention concerns improvements in or relating to magnetic stores for binary information which include a memory member made of thin layers wherein the information bits are represented as magnetic domains of distinct orientations of magnetization in a uniaxial anisotropic material and wherein said significant magnetic domains may progress along channels defined in said thin layer memory member.

THE PRIOR ART

As known such magnetic domain propagation channels may consist of patterns presenting a value of coercive field appreciably lower than the value of the coercive field in the member outside such channels. Illustratively, for instance, the value of the coercive field within the channels may of the order from about 2 to 3 Oersteds whereas the value of the coercive field in the member outside such channels may be of the order of about 30 Oersteds and more.

It has been proposed to design such a kind of memory member by coating a low coercivity magnetic material with a high coercivity magnetic material except over the required pattern of magnetic domain propagation channels. Such a design entails the formation of magnetic discontinuities at the edges of the magnetic domain propagation channels and, consequently, the creation of free magnetic charges along such discontinuities. Said free magnetic charges create a spurious field which actually acts on the magnetization conditions within the channels in the same way as acts any externally applied magnetic field. Particularly, such a spurious field vectorially adds to the magnetic fields which are applied through appropriately activated conductors for controlling the propagation of the magnetic domains within the channels. When the thickness of the coating layer is sufficiently important, the said spurious magnetic field generated by such free magnetic charges may reach such a high value as to disturb the normal operation of the store and may even lead to erasement of information bit representing domains within said channels.

SUMMARY OF THE INVENTION

Accordingly, it is the object of the invention to provide a new and novel structure of a magnetic memory member including information bit magnetic domain propagation channels which does not generate any free magnetic charges along the edges of said channels.

According to a feature of the invention, such a structure is mainly characterized in that it comprises a first thin magnetic layer of soft magnetic anisotropic material, non-magnetic metallizations applied over said first layer in accordance with the pattern of magnetic domain propagation channels required in the member and a second layer of hard magnetic material over said first layer and surface metallizations thereof.

This and further features will appear from the following description of an illustrative embodiment of the invention shown in the single FIGURE of the accompanying drawings, from which may be directly deduced any technological modifications falling within the scope of the accompanying claims.

DESCRIPTION OF THE EMBODIMENT

In the illustrative embodiment shown in the drawings, the information bit significant magnetic domains will be capable to progress along such propagation channels as shown at 5, the shape of which is solely shown in an illustrative fashion. The structure of the memory member may be provided on a non-magnetic substrate 1 which may be made as well of a conductive material such as copper or another non magnetic metal as of a non magnetic dielectric or insulating material such for instance as glass or ceramics. On the substrate 1 is formed a thin layer 2 of a soft anisotropic magnetic material, i.e., a material of low value of coercive field. The thickness of said layer 2 is comprised in the film range of thicknesses and, illustratively it may be for instance of the order of 1,500 A. Application of such a layer on the substrate may be made according to any classical method, for instance from a conventional evaporation of the components thereof in presence of an orientating magnetic field imparting uniaxial anisotropy to the finally formed layer, the easy magnetization axis of which may be substantially perpendicular to the plane of the cross-section shown in the FIGURE. Illustratively, though not restrictively, the material of said layer 2 may be an iron-nickel-cobalt alloy including in weight, 15 percent iron, 72 percent nickel and 13 percent cobalt. The intrinsic coercive field of such a material is of the order from about 2 to 3 Oersteds in the easy magnetization axis direction and the value of the anisotropy field is of the order of about 12 to 15 Oersteds in the direction of difficult magnetization of the layer.

Non magnetic conductive metallizations, made of gold or any other metal or alloy which is difficult to oxidize, are coated over the magnetic layer 2 in accordance with a required pattern of the magnetic domain propagation channels to obtain. Such conductors 4 may for instance be deposited through a mask perforated according to such a pattern. The thickness of the metallizations is not deemed critical provided it suffices to ensure a complete absence of magnetic coupling between the layer 2 and a further magnetic layer 3 to be hereinafter described. For ensuring such a magnetic absence of coupling, the thickness of the conductors 4 must be higher than 100 A but, for being sure that no "holes" can exist in the conductors, their thickness will be brought to a value of the range from about 500 to about 1,000 A. It may of course be higher than 1,000 A if desired.

A second continuous magnetic layer 3 is formed over the layer 2 and metallizations 4 thereon. Said second layer is made of a "hard" magnetic material, i.e., a material having a coercive field definitely stronger than the coercive field of the material of layer 2, for instance a material which, considered alone on a substrate would present a coercive field of an order from about 400 to 600 Oersteds. The thickness of the layer 3 is definitely not critical and, illustratively, may be varied at will from about 1,000 A up to about 1 micron without practically affecting the finally desired result. More precisely, the behavior of the memory member is not affected by local variations in thickness of the layer 3. The material of said layer 3 may advantageously be an alloy containing cobalt and phosphorus and, illustratively, an alloy of the following composition:— in weight, about 90 to 92 percent cobalt, about 0.5 to 3 percent phosphorus and about 6 to 10 percent wolfram or nickel. Layer 3 may be obtained from application of any conventional methods, either from electrolytic deposition or auto-catalitical chemical deposition for instance.

With a memory member structure according to the present invention, the parts of layer 2 which are under the metallizations 4 present a low coercive field value, actually the intrinsic value of the coercive field of the material of said layer 2. It is so because the metallizations 4 ensure an absence of coupling at their locations between the materials of the layers 2 and 3. On the other hand, the parts of the memory member outside such metallizations, wherein the layers 2 and 3 are contacting one another, consequently being in tight magnetic mutual coupling, present a coercive magnetic field value of the order of 30 to about b60 Oersteds. Consequently, the magnetic domain propagation channels 5 are neatly defined in the memory member and the absence of magnetic discontinuities along the edges of said channels, more precisely, along the edges of the metallizations 4, duly avoid the production of free magnetic charges along said edges, consequently the production of any spurious magnetic fields tending to disturb the operation of the store and erase the information magnetic domains within the channels.

What is claimed is:

1. A magnetic memory member comprising:

a. a non-magnetic substrate;

b. a first magnetic layer coated over a complete surface of said substrate, said first magnetic layer being of anisotropic material having a coercive field of the order of a few Oersteds;

c. a non-magnetic metal coating applied over said first magnetic layer and formed in a desired pattern for domain propagation channels;

d. a second magnetic layer coated over the surface of said first magnetic layer and said non-magnetic metal coating, said second magnetic layer being of a material having a coercive field of the order of a few hundred Oersteds, said non-magnetic metal coating being of sufficient thickness to insure localized decoupling between the first and second magnetic layers thereby to define magnetic domain propagation channels in said first anisotropic magnetic layer.

2. A magnetic memory member according to claim 1, wherein said first magnetic layer is a film of about from one to 2000 Angstroms and the said metal coating is more than 100 Angstroms thick.

3. A magnetic memory member according to claim 2, wherein said second magnetic layer is of a thickness in the range from about 1,000 Angstroms up to the order of one micron.

4. A magnetic memory member according to claim 3, wherein said first magnetic layer is an iron-nickel-cobalt alloy having an intrinsic coercive field of about 2 to 3 Oresteds, and said second magnetic layer is a cobalt-phosphorus-wolfram alloy having an intrinsic coercive field of about 400 to 600 Oersteds.

5. A magnetic memory member according to claim 3 wherein said first magnetic layer is an iron-nickel-cobalt alloy having an intrinsic coercive field of about 2 to 3 Oersteds, and said second magnetic layer is a cobalt-phosphorus-nickel alloy having an intrinsic coercive field of about 400 to 600 Oersteds.

* * * * *